US011047696B2

(12) United States Patent
Batta et al.

(10) Patent No.: US 11,047,696 B2
(45) Date of Patent: Jun. 29, 2021

(54) METHODS AND SYSTEMS FOR DETERMINING AND ASSIGNING A PRIMARY POINT-OF-INTEREST TYPE FOR A POINT-OF-INTEREST

(71) Applicant: Verizon Patent and Licensing Inc., Arlington, VA (US)

(72) Inventors: Andrew Batta, Broomfield, CO (US); Jonathan Harahush, Golden, CO (US); Chad Kearney, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 217 days.

(21) Appl. No.: 16/166,081

(22) Filed: Oct. 20, 2018

(65) Prior Publication Data
US 2020/0124433 A1 Apr. 23, 2020

(51) Int. Cl.
*G01C 21/34* (2006.01)
*G01C 21/36* (2006.01)
*G06N 3/08* (2006.01)

(52) U.S. Cl.
CPC ..... *G01C 21/3476* (2013.01); *G01C 21/3682* (2013.01); *G06N 3/08* (2013.01)

(58) Field of Classification Search
CPC .. G01C 21/3476; G01C 21/3682; G06N 3/08; G06N 3/0454; G06F 3/048
See application file for complete search history.

(56) References Cited

U.S. PATENT DOCUMENTS

| 2011/0113040 A1* | 5/2011 | Bickel | G06F 16/9537 |
| | | | 707/749 |
| 2019/0179917 A1* | 6/2019 | Agrawal | G01C 21/3605 |

OTHER PUBLICATIONS

Moawad, Assaad; "Encoding concepts, categories and classes for neural networks". Medium.com. Jul. 30, 2018 (see attached PDF version) (Year: 2018).*

* cited by examiner

*Primary Examiner* — Michael V Kerrigan (57) ABSTRACT

An exemplary point-of-interest identification system accesses data for a point-of-interest. The system generates a plurality of scores for the point-of-interest based on one or more of a plurality of predefined features found in the data for the point-of-interest and on a machine learning model. The system selects, based on the plurality of scores, a primary point-of-interest type for the point-of-interest. The system includes the selected primary point-of-interest in a dataset for the point-of-interest. Corresponding methods and systems are also disclosed.

20 Claims, 7 Drawing Sheets

METHODS AND SYSTEMS FOR DETERMINING AND ASSIGNING A PRIMARY POINT-OF-INTEREST TYPE FOR A POINT-OF-INTEREST

BACKGROUND INFORMATION

Computer-implemented mapping service systems may provide a representation of a point-of-interest on a user interface map. The representation may be text and/or any type of graphic that may be based, at least in part, on data found in a dataset for the point-of-interest.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for determining and assigning a primary point-of-interest type for a point-of-interest are described herein. In an example, a point-of-interest identification system may access data for a point-of-interest and determine whether one or more of a plurality of predefined features are found in the data for the point-of-interest. The point-of-interest identification system may generate a plurality of scores for the point-of-interest based on one or more of the plurality of predefined features found in the data for the point-of-interest and on a computer learning model. The point-of-interest identification system may select, based on the plurality of scores, a primary point-of-interest type for the point-of-interest. The point-of-interest identification system may include the selected primary point-of-interest in a dataset for the point of interest and store the dataset in a points-of-interest data store.

Methods and systems described herein for determining and assigning a primary point-of-interest type for a point-of-interest may provide various benefits, which may include one or more advantages over point-of-interest identification technologies used in conventional computer-implemented mapping service systems. For example, by generating a plurality of scores for a point-of-interest based on one or more of a plurality of predefined features found in data for the point-of-interest and on a computer learning model, and selecting, based on the plurality of scores, a primary point-of-interest to be included in a dataset for the point-of-interest, systems and methods described herein may select a correct and/or preferred primary point-of-interest type with improved accuracy compared to point-of-interest identification technologies used in conventional computer-implemented mapping service systems.

An assigned primary point-of-interest type for a point-of-interest may be utilized by a computer-implemented mapping service system to select and provide an icon to represent the point-of-interest on a user interface map. In an example, the icon may represent the assigned primary point-of-interest type specifically. This way of utilizing a determined and assigned primary point-of-interest type for a point-of-interest may provide accuracy and/or reliability in visually indicating the primary point-of-interest type for a point-of-interest on a user interface map, which may allow different icons to be accurately and/or reliably used to specifically represent different primary point-of-interest types of points-of-interest on a user interface map.

Various embodiments will now be described in more detail with reference to the figures. The disclosed systems and methods may provide one or more of the benefits mentioned above and/or various additional and/or alternative benefits that will be made apparent herein.

Figure 1:
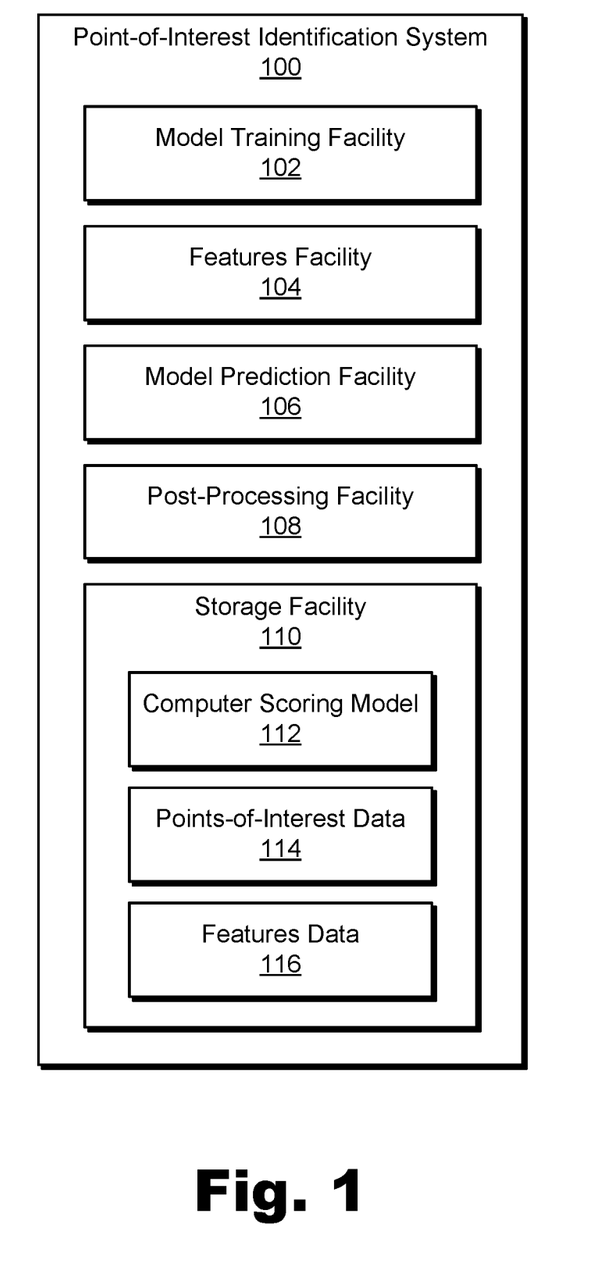
FIG. 1 illustrates a point-of-interest identification system according to principles described herein.

FIG. 1 illustrates an exemplary point-of-interest identification system 100 ("system 100") configured to determine and assign a primary point-of-interest type for a point-of-interest. As shown, system 100 may include, without limitation, a model training facility 102, a features facility 104, a model prediction facility 106, a post-processing facility 108, and a storage facility 110, selectively and communicatively coupled to one another. It will be recognized that although facilities 102 through 110 are shown to be separate facilities in FIG. 1, facilities 102 through 110 may be combined into fewer facilities, such as into a single facility, or divided into more facilities as may serve a particular implementation. In some examples, facilities 102 through 110 may be distributed between multiple devices and/or multiple locations as may serve a particular implementation. Additionally, one or more of facilities 102 through 110 may be omitted from system 100 in certain implementations, while additional facilities may be included within system 100 in the same or other implementations.

Each of facilities 102 through 110 may include or be implemented by computing hardware and/or software components (e.g., processors, memories, communication interfaces, instructions stored in memory for execution by the processors, etc.). The facilities may be implemented using separate computing components unique to each facility, or may be implemented using shared computing components.

The facilities of system 100 may perform one or more of the operations described herein to determine and assign a primary point-of-interest type for a point-of-interest. For example, system 100 may access data for a point-of-interest, generate a plurality of scores for the point-of-interest based on one or more of a plurality of predefined features found in the data, select a primary point-of-interest type for the point-of-interest based on the scores for the point-of-interest, and include the selected primary point-of-interest type in a dataset for the point-of-interest.

In certain examples, system 100 may implement and use a machine learning model to generate scores for the point-of-interest based on one or more of a plurality of predefined features found in data for the point-of-interest. For example, for a point-of-interest, system 100 may determine whether one or more of a plurality of predefined features are found in the data for the point-of-interest. Based on the determination, system 100 may generate a data structure such as a vector for the point-of-interest. The vector may be generated to include values indicative of predefined features found in the data for the point-of-interest. System 100 may provide the vector as input to a machine learning model, such as a trained computer scoring model, which may be executed by system 100 to generate, based on the vector, a plurality of scores for the point-of-interest. System 100 may select, based on the scores for the point-of-interest, a primary point-of-interest type for the point-of-interest. System 100 may include the primary point-of-interest type in a dataset for the point-of-interest.

Each of the facilities of system 100 and exemplary operations that may be performed by the facilities of system 100 to determine and assign a primary point-of-interest type to a point-of-interest will now be described in more detail.

Storage facility 110 may store and maintain any data received, generated, managed, used, and/or transmitted by facilities 102 through 108 as may serve a particular implementation. In some examples, for instance, storage facility 110 may include data representative of a computer scoring model 112, points-of-interest data 114, and features data 116.

Computer scoring model 112 may include any type or implementation of a machine learning computer scoring model for scoring a point-of-interest. For instance, the computer scoring model may include a neural network having an input layer, any suitable number of hidden layers, and an output layer. The neural network may be a convolutional neural network, a residual convolutional neural network, or any other suitable neural network. In other implementations, computer scoring model 112 may include any other suitable machine learning model configured or configurable to score a point-of-interest.

Points-of-interest data 114 may include any data representing and/or otherwise associated with one or more points-of-interest. For example, points-of-interest data 114 may represent points-of-interest (e.g., features of points-of-interest), data structures such as vectors that are generated for points-of-interest, scores that are generated for points-of-interest, and/or primary point-of-interest types that are determined for points-of-interest. Examples of features of points-of-interest may include, but are not limited to, standard industry classification (SIC) codes, franchise codes, hours of operation, and contact names for the points-of-interest. In certain examples, SIC codes may be numeric categories representative of items or services provided at the points-of-interest. Similarly, franchise codes may be numeric categories representative of known franchise names. Examples of primary point-of-interest types include, but are not limited to, a bank, a grocery store, a gas station, a restaurant, a bar, a doctor office, a medical center, a vehicle repair shop, and a generic point-of-interest type. Additional examples of data for a point-of-interest are described herein.

Features data 116 may include data representing a set of defined features on which scoring of a point-of-interest may be based. Features data 116 may represent the features and rules indicating how to use the features to evaluate data for a point-of-interest. In certain examples, the features may be used by system 100 to evaluate data for a point-of-interest and to generate a vector that represents the evaluations of the data for the point-of-interest. Examples of features and ways that features may be used by system 100 to score a point-of-interest are described herein.

Model training facility 102 may be configured to train a computer scoring model, such as computer scoring model 112, to score data for a point-of-interest. For example, model training facility 102 may execute one or more training sessions, of a training phase, to train a computer scoring model capable of machine learning. A training session may be performed in any suitable way. For example, model training facility 102 may submit one or more sets of training data representing test points-of-interest to the computer scoring model for supervised machine learning by the computer scoring model, such that the computer scoring model learns to generate a plurality of scores based on data for a point-of-interest. In certain examples, model training facility 102 may submit as training data, to the computer scoring model, a test vector for a test point-of-interest and an identification of a correct or preferred primary point-of-interest type for the test point-of-interest. The computer scoring model may use the test vector and the identification of the correct or preferred primary point-of-interest type to learn how to weigh values in a vector to generate a highest score (as compared to scores associated with other point-of-interest types) for the identified correct or preferred primary point-of-interest type. In certain examples, each of the scores for a point-of-interest may be associated with a different point-of-interest type and represent a likelihood that the point-of-interest type is correct or preferred for the point-of-interest as will be described in more detail herein.

Model training facility 102 may be configured to train a machine learning computer scoring model in any suitable way. For example, model training facility 102 may train the computer scoring model starting from scratch using a test point-of-interest (e.g., test vector generated from the test point-of-interest) and a user selected correct or preferred primary point-of-interest type, and/or may further train the computer scoring model using additional training data for test points-of-interest. An example of model training facility 102 training a computer scoring model is described in more detail herein.

Features facility 104 may be configured to generate any suitable data structure to indicate one or more features found in data for a point-of-interest. In certain examples, features facility 104 may be configured to generate a vector data structure for the point-of-interest. Such a vector data structure may include a set of values that are assigned by features facility 104 based on whether a set of predefined features are found in data for a point-of-interest. To illustrate, features facility 104 may evaluate multiple features with respect to data for a point-of-interest and assign various values in a vector to represent evaluation results for the features.

In certain examples, based on accessed data for a point-of-interest, features facility 104 may create an instance of a vector data structure and assign values to the vector data structure (e.g., to fields of the vector data structure) based on evaluations that determine features that are found in the accessed data for the point-of-interest. While any suitable values may be assigned, in certain implementations, values of 0 or 1 and/or values between 0 and 1 may be assigned to a vector.

Model prediction facility 106 may be configured to execute a runtime operation of a computer scoring model, such as computer scoring model 112, to generate a plurality of scores for a point-of-interest. For example, model prediction facility 106 may submit a data structure, such as a vector data structure generated by features facility 104, for a point-of-interest to the computer scoring model, which may use the data structure to generate scores for the point-of-interest.

The computer scoring model may generate the scores in any suitable way, using any suitable data for the point-of-interest as input to the computer scoring model. For example, data for the point-of-interest submitted to the computer scoring model may include a vector for the point-of-interest. The vector may include values generated, by a pre-processing operation, based on various defined features found in the data for the point-of-interest, as described herein. In other examples, the input to the computer scoring model may be in other suitable forms of data representative of the point-of-interest.

The computer scoring model may output scores for the point-of-interest. The output for a point-of-interest may be in any suitable form, including a data structure such as a vector. The vector may be generated to include scores indicative of a likelihood that a respective point-of-interest type is a correct or preferred point-of-interest type for the point-of-interest. While any suitable scores may be generated by the computer scoring model, in certain implementations, each of the scores may range between 0 and 1.

Post-processing facility 108 may be configured to perform one or more operations on the outputs of a computer scoring model in order to select a primary point-of-interest type for the point-of-interest. For example, post-processing facility 108 may select a primary point-of-interest type from a plurality of point-of-interest types based on scores for a point-of-interest. In certain examples, post-processing facility 108 may rank the scores for the point-of-interest and select a primary point-of-interest type based the ranked scores. In an example, each of the plurality of scores may be located at a different position within a vector generated by the computer scoring model, and each position within the vector may be associated with a different point-of-interest type. In one example, post-processing facility 108 may determine a position of a highest-ranked score within a vector of scores, and select, as a primary point-of-interest type, a point-of-interest type associated with the position in the vector for the highest-ranked score. In another example, post-processing facility 108 may select, as a primary point-of-interest type, a generic point-of-interest type if none of the scores generated by the computer scoring mode are above a threshold score level. In another example, post-processing facility 108 may determine that a highest-ranked score corresponds to a predefined feature that has been flagged for generic-only categorization based on the highest-ranked score being located at a flagged position within the vector of scores, and select, as a primary point-of-interest type, a generic point-of-interest type based on the highest-ranked score being located at the flagged position in the vector. Examples of post-processing facility 108 selecting a primary point-of-interest type are described in more detail herein.

Post-processing facility 108 may include a selected primary point-of-interest type for a point-of-interest in a dataset for the point-of-interest. The selected primary point-of-interest type may be stored in the dataset such that the primary point-of-interest type for the point-of-interest, as well as other data for the point-of-interest in some examples, is accessible and useable by a suitable computer-implemented system and/or application, such as a computer-implemented mapping service system. Exemplary features of system 100 and/or operations that may be performed by system 100 will now be described in more detail.

Figure 2:
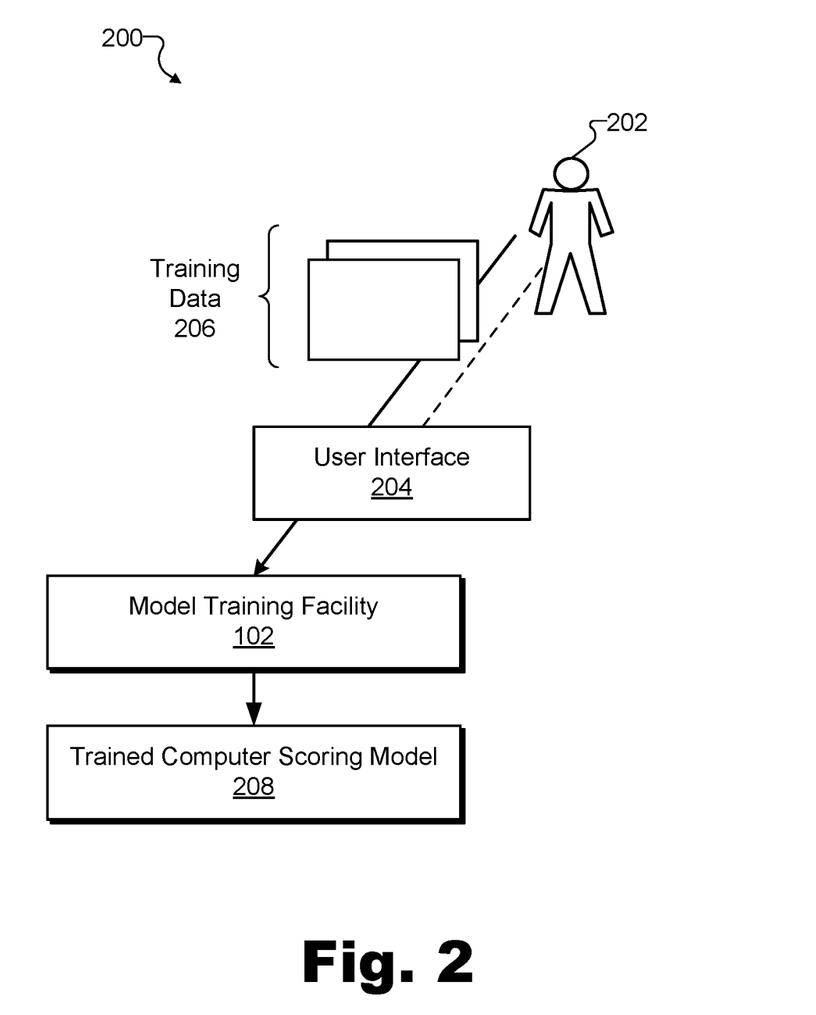
FIG. 2 illustrates an exemplary configuration for training a computer scoring model according to principles described herein.

FIG. 2 illustrates an exemplary configuration 200 for training a computer scoring model. As shown, a user 202 may provide, via a user interface 204, training data 206 to model training facility 102, which may utilize the training data 206 to train a computer scoring model, such as computer scoring model 112 of FIG. 1, in any suitable manner. Specifically, model training facility 102 may use training data 206 to train a computer scoring model to generate a plurality of scores for a point-of-interest.

In one example, training data 206 may include any suitable data representative of test point-of-interest. For example, the training data 206 may include a test vector for the test point-of-interest, which may indicate one or more features found in data for the test point-of-interest as will be described in more detail herein. The training data 206 may also include an identification of a correct or preferred primary point-of-interest type for the test point-of-interest.

In certain examples, prior to user 202 providing the training data 206 to user interface 204, a test vector for the test point-of-interest may be generated in any suitable manner, including user 202 creating the test vector based on defined features. To illustrate, for a test point-of-interest, user 202 may evaluate defined features with respect to data for the point-of-interest. Based on the evaluations, user 202 may assign values to a test vector, which values represent evaluation results for the features (e.g., whether the features are found within data for the test point-of-interest). In a similar but alternative manner, features facility 104 may generate, from data for a test point-of-interest, the test vector for the training data 206. In an example, a value in a test vector may be 0 or 1 depending on whether a corresponding feature is found within data for the test point-of-interest, such as a value of 1 if a feature is found or a value of 0 if the feature is not found.

During a training phase, model training facility 102 may execute one or more sessions to facilitate training of a computer scoring model based on training data 206. In some examples, model training facility 102 may access and use both the test vector and the identification of the correct or preferred primary point-of-interest type to train the computer scoring model to generate a plurality of scores for a point-of-interest in any suitable way. For example, during the training phase, model training facility 102 may use any suitable machine learning technologies to perform operations to facilitate learning, by a computer scoring model, of how to weigh values within the test vector of the training data 206, such that a score for the correct or preferred primary point-of-interest type (e.g., a score at a position of a vector corresponding to the correct or preferred primary point-of-interest type) receives a highest score of all of the scores for the point-of-interest (e.g., a highest scores of all of the scores in the vector).

In certain examples, model training facility 102 may train the computer scoring model to score a point-of-interest as a generic point-of-interest type in any suitable way. For example, model training facility 102 may access training data 206 including a generic point-of-interest type, as the identified correct point-of-interest type for a test point-of-interest, and train the computer scoring model to weigh the values within the test vector, such that a score for the correct or preferred primary point-of-interest type (e.g., a score at a position of a vector corresponding to the correct or preferred primary point-of-interest type) receives a highest score of all scores for the point-of-interest (e.g., a highest score of all of the scores in the vector).

In some examples, a level of difficulty to properly score data for a point-of-interest may vary between training sessions. In one example, during one training session, model training facility 102 may receive training data 206 for a test point-of-interest that is easily scored so that a point-of-interest type identified as a correct point-of-interest type receives the highest score. In a different iteration of the training sessions, training data 206 may include a point-of-interest that is difficult to properly score (e.g., an edge case). However, in both of the training sessions above, model training facility 102 may utilize the identification of a correct primary point-of-interest type to facilitate learning, by the computer scoring model, how to properly score a point-of-interest so that a score associated with the identified correct primary point-of-interest type receives the highest score. Thus, model training facility 102 may utilize training data 206 with various levels of difficulty to train a computer scoring model.

Completion of a training phase, by model training facility 102, results in a trained computer scoring model 208 that is configured to generate scores for a point-of-interest. In one example, the trained computer scoring model 208 may be stored in a data store, such as storage facility 110, and may be executed during runtime by any suitable computing component, including model prediction facility 106, to score data for a point-of-interest.

In certain examples, after completion of an initial training phase, which results in trained computer scoring model 208, user 202 may initiate (in model training facility 102) an additional training phase with one or more training sessions so that a new point-of-interest type may be added to trained computer scoring model 208. In an example, training data 206 may include data for a point-of-interest and identification of a correct primary point-of-interest type (e.g., the new point-of-interest type) for the point-of-interest. Multiple training sessions may be performed by model training facility 102 to facilitate training of the computer scoring model to properly score points-of-interest (associated with the new point-of-interest type), so that the new point-of-interest type is selected as the primary point-of-interest type.

Completion of this additional training phase, by model training facility 102, results in trained computer scoring model 208 being configured to generate scores for a point-of-interest with a new score (for the new point-of-interest type) included in the plurality of scores output from the trained computer scoring model 208.

Figure 3:
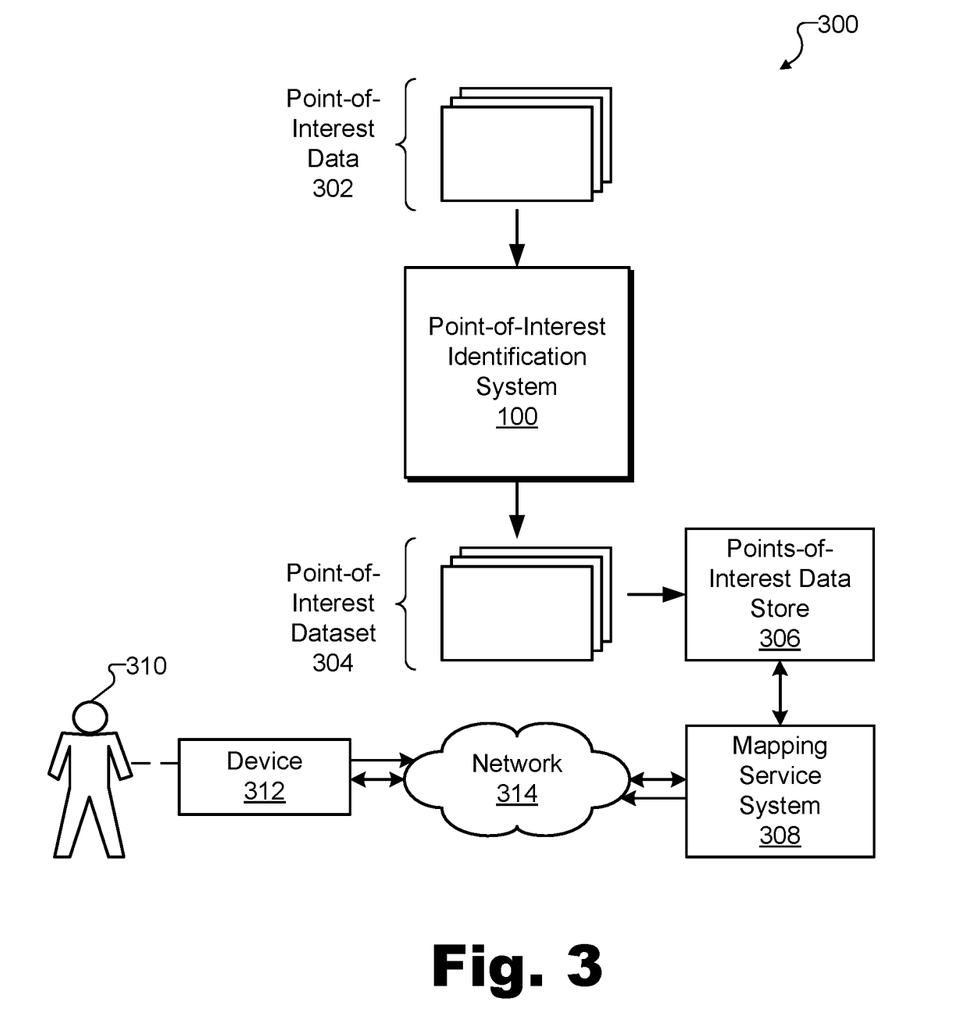
FIG. 3 illustrates an exemplary configuration for determining, assigning, and utilizing a primary point-of-interest type for a point-of-interest according to principles described herein.

FIG. 3 illustrates an exemplary configuration 300 in which point-of-interest identification system 100 may operate to determine and assign a primary point-of-interest type for a point-of-interest. For example, as shown, point-of-interest identification system 100 may access data 302 for a point-of-interest, determine a primary point-of-interest type for the point-of-interest, include the primary point-of-interest type in a dataset 304 for the point-of-interest, and store the dataset 304 in a data store, such as points-of-interest data store 306. A mapping service system 308 may access the dataset 304 within the points-of-interest data store 306 and utilize the dataset 304 to provide a representation of the point-of-interest to a user 310 via a computing device 312 ("device 312") and a network 314. As shown, mapping service system 308 may be communicatively coupled with device 312 by way of network 314. Mapping service system 308 and device 312 may communicate one with another by way of network 314.

Network 314 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks. Accordingly, data may flow between mapping service system 308 and device 312 by way of network 314 using any communication technologies, devices, media, and protocols as may serve a particular implementation.

Device 312 may be implemented as any suitable computing device able to be operated, by a user 310, to view a user interface map and/or search results provided by mapping service system 308. For example, device 312 may be a mobile phone (e.g., a smartphone), a tablet device, a laptop computer, a personal computer, a wearable computing device, a navigational device, or the like configured to receive data representative of a user interface map and/or search results provided by mapping service system 308 to device 312 via network 314.

In some examples, data 302 for a point-of-interest may include any suitable data to represent the point-of-interest. For example, data 302 may include any suitable number of features associated with the point-of-interest. As stated above, examples of such features may include, but are not limited to, standard industry classification (SIC) codes, franchise codes, hours of operation, and a contact name for the point-of-interest. In certain examples, SIC codes may be numeric categories representative of items or services provided at the point-of-interest. Similarly, franchise codes may be numeric categories representative of known franchise names. In some examples, additional and/or alternative features (e.g., text representative of items provided at the point-of-interest, text representative of services provided at the point-of-interest, etc.) may be included in data 302. In certain examples, data 302 indicating multiple features enables the point-of-interest to be identified in more searches as compared to data 302 that indicating only one or two features, but prevents a single point-of-interest type from easily being determined.

One or more exemplary operations of point-of-interest identification system 100 will now be described with respect to an exemplary point-of-interest named 'Superstore'. Data 302 for the exemplary point-of-interest may indicate exemplary features (e.g., SIC codes, franchise codes, hours of operation, etc.) of the point-of-interest, including features such as a pharmacy, a florist, a meat market, furniture, groceries, a bank, and hours of operation from 7 am to 11 pm associated with the point-of-interest.

Point-of-interest identification system 100 may determine and assign a primary point-of-interest type based on data 302 for the point-of-interest in any suitable way. For example, point-of-interest identification system 100 may determine a primary point-of-interest type by performing one or more operations including, but not limited to, accessing data 302 representative of a point-of-interest, generating a vector for the point-of-interest, scoring (e.g., generating multiple scores) the point-of-interest based on the vector for the point-of-interest, and selecting a primary point-of-interest type based on the scores for the point-of-interest.

Point-of-interest identification system 100 may access data 302 for the point-of-interest in any suitable manner. For example, point-of-interest identification system 100 may access data 302 for the point-of-interest by receiving data 302 from one or more sources such as one or more data stores.

Point-of-interest identification system 100 may utilize data 302 to determine a primary point-of-interest type for the point-of-interest. In one example, upon receiving data 302, point-of-interest identification system 100 may perform one or more operations to generate, based on data 302, a vector for the point-of-interest. For example, point-of-interest identification system 100 may evaluate various features, such as predefined features represented by features data 116, with respect to data 302 of the point-of-interest, and generate a vector for the point-of-interest based on the evaluations. In one example, a vector may be generated to include multiple values, and each value may represent a result of an evaluation of a different feature with respect to data 302 for the point-of-interest as described herein.

An evaluation of a feature relative to data 302 for a point-of-interest may be based on any suitable criteria including, but not limited to, whether a feature is found in data 302 for the point-of-interest. To facilitate evaluation of features relative to data 302, a set of features may be defined in advance of receipt of data 302 for a point-of-interest such that the features are ready to be used by system 100 to evaluate data 302 for the point-of-interest and to generate a vector for the point-of-interest. Examples of features (that may be evaluated with respect to data 302 of a point-of-interest as described herein) may include, but are not limited to, one or more SIC codes, such as a SIC code for a gas station, a SIC code for a florist, a SIC code for a pharmacy, a SIC code for beverages, a SIC code for groceries, a SIC code for a meat market, and one or more franchise codes, such as a franchise code for a franchise named STAR-BUCK'S and a franchise code for a franchise names MCDONALD'S. For purpose of describing certain examples herein, these examples of features may be defined to be a set of features used to generate a vector for a point-of-interest. However, additional and/or alternative features (e.g., hours of operation end at 5 pm, hours of operation end at 11 pm, hours of operation end at 2 am, a time range for hours of operation, inclusion of a contact name for point-of-interest, a keyword (e.g., church) in the name of the point-of-interest, etc.) may be included in a defined set of features in some examples, or may be utilized (e.g., as criteria to select between two close scores) in one or more post-processing operations for selection of the primary point-of-interest type. Accordingly, a set of defined features may be defined to suit a particular implementation.

As mentioned above, based on the evaluation of the defined features relative to data 302 for a point-of-interest, point-of-interest identification system 100 may generate a vector that includes values of 0 or 1. In certain examples, a vector may include any suitable number of values, such as the same number as the number of features evaluated (e.g., each value may represent a result of an evaluation of a corresponding feature). Additionally, the values in a vector may be in any suitable order. In certain examples, each vector generated for a different point-of-interest includes a same number and arrangement of value fields such that a value for an evaluation of a particular feature is located at the same position in each of the vectors.

An example of point-of-interest identification system 100 generating a vector based on data 302 for a point-of-interest will now be described. Continuing with 'Superstore' as an exemplary point-of-interest, data 302 may indicate exemplary features (e.g., SIC codes, franchise codes, hours of operation, etc.) of a pharmacy, a florist, a meat market, furniture, groceries, a bank, and hours of operation from 7 am to 11 pm associated with the point-of-interest.

Based on the exemplary set of defined features described above, for example, point-of-interest identification system 100 may assign a value of '0' in a first position of the vector based on feature 'SIC code representative of a gas station' not being found in the data 302 for the exemplary point-of-interest 'Superstore'. Point-of-interest identification system 100 may evaluate all features with respect to data 302 in a similar manner, until values for all features are assigned to a vector. For example, a generated vector (e.g., vector 406 in FIG. 4) for the exemplary point-of-interest 'Superstore' based on data 302 may be '0,1,1,1,1,1,0,1,1,0,0, . . . ' based on the evaluation of the above predefined features (and any other suitable features) with respect to data 302 for the exemplary point-of-interest 'Superstore'. In certain examples, the vector 406 generated based on the predefined features and data 302 for the exemplary point-of-interest 'Superstore' may be utilized by point-of-interest identification system 100 to generate scores for the exemplary point-of-interest, as will be described with reference to FIG. 4.

Figure 4:
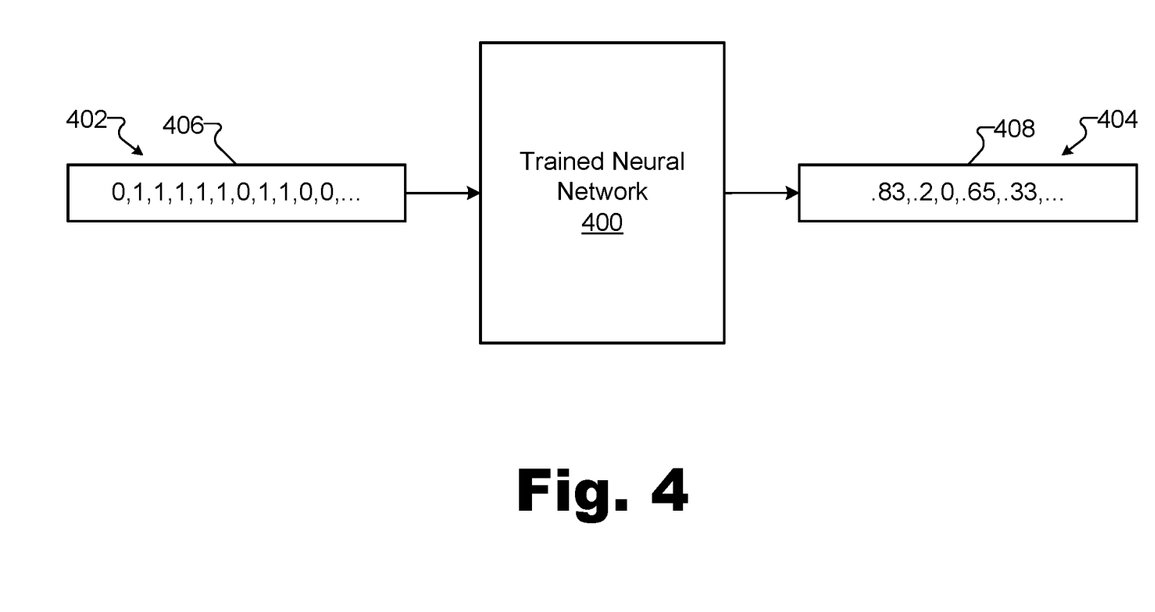
FIG. 4 illustrates exemplary inputs and outputs of a trained neural network according to principles described herein.

FIG. 4 illustrates a trained neural network 400 that receives input 402 at an input layer, performs one or more operations on input 402 at any suitable number of hidden layers, and provides output 404 at an output layer.

In one example, trained neural network 400 may receive vector 406 for the point-of-interest as input 402. Trained neural network 400 may generate various scores 408 (as output 404) for the point-of-interest based on the vector 406 in any suitable way. For example, a plurality of scores 408 may be generated based on any combination of the values within vector 406. In an example, trained neural network 400 may generate a data structure, such as a vector of scores 408 of '0.83, 0.2, 0, 0.65, 0.33, . . . ' for the exemplary point-of-interest 'Superstore' based on the values '0,1,1,1, 1,1,0,1,1,0,0, . . . ' of vector 406. As mentioned above, each of the scores in the vector of scores 408 for the point-of-interest may represent a likelihood (e.g., a percentage) that a corresponding point-of-interest type is a correct or preferred primary point-of-interest type for the point-of-interest, and each of the scores 408 may range from 0 to 1.

In one example, trained neural network 400 may add a weighting factor to each of the values in vector 406. Based on the weighting factors of the values, trained neural network 400 may generate each of the scores 408 for the point-of-interest. In certain examples, the weights applied to each of the values may vary (e.g., between vectors for different points-of-interest) depending on all values in the vector 406, and trained neural network 400 may generate different scores 408 based on the different weights. Thus, based on the weighted values within the vector 406, trained neural network 400 may generate various scores 408 for a point-of-interest. These generated scores 408 may then be provided as output 404 from trained neural network 400.

Returning to FIG. 3, point-of-interest identification system 100 may perform one or more operations based on the scores 408 for a point-of-interest to select a primary point-of-interest type for the point-of-interest. In one example, point-of-interest identification system 100 may rank the scores 408 in any suitable way, such as from highest to lowest.

Based on the ranking, point-of-interest identification system 100 may select a primary point-of-interest type for a point-of-interest in any suitable way. In one example, point-of-interest identification system 100 may determine a position of a highest-ranked score within the vector of scores, and select, as a primary point-of-interest type for the point-of-interest, a point-of-interest type associated with the position in the vector for the highest-ranked score (that is also above a threshold score level). In another example, point-of-interest identification system 100 may determine that none of the scores 408 satisfy a minimum threshold score level, and based on this determination, select a generic point-of-interest type as the primary point-of-interest type for the point-of-interest. In another example, point-of-interest identification system 100 may determine that the highest-ranked score of the scores 408 corresponds to a position in a vector for a predefined feature that has been flagged for generic-only categorization based on the highest-ranked score being located at a flagged position within the vector of scores, and select as a primary point-of-interest type for the point-of-interest, a generic point-of-interest type based on the highest-ranked score being located at the flagged position within the vector.

Point-of-interest identification system 100 may perform one or more operations based on the selection of the primary point-of-interest type. For example, point-of-interest identification system 100 may assign the selected point-of-interest type to the point-of-interest in any suitable way. For instance, point-of-interest identification system 100 may perform the assignment by including the selected primary point-of-interest type in a dataset 304 for the point-of-interest and storing the dataset 304 in a data store, such as a points-of-interest data store 306.

As mentioned above, in certain examples, datasets for different points-of-interest, such as dataset 304, may be accessed by mapping service system 308. In such examples, mapping service system 308 may perform one or more operations to provide a user interface map that includes one or more icons that are displayed based the accessed datasets from points-of-interest data store 306, as will be described with reference to FIG. 5.

Figure 5:
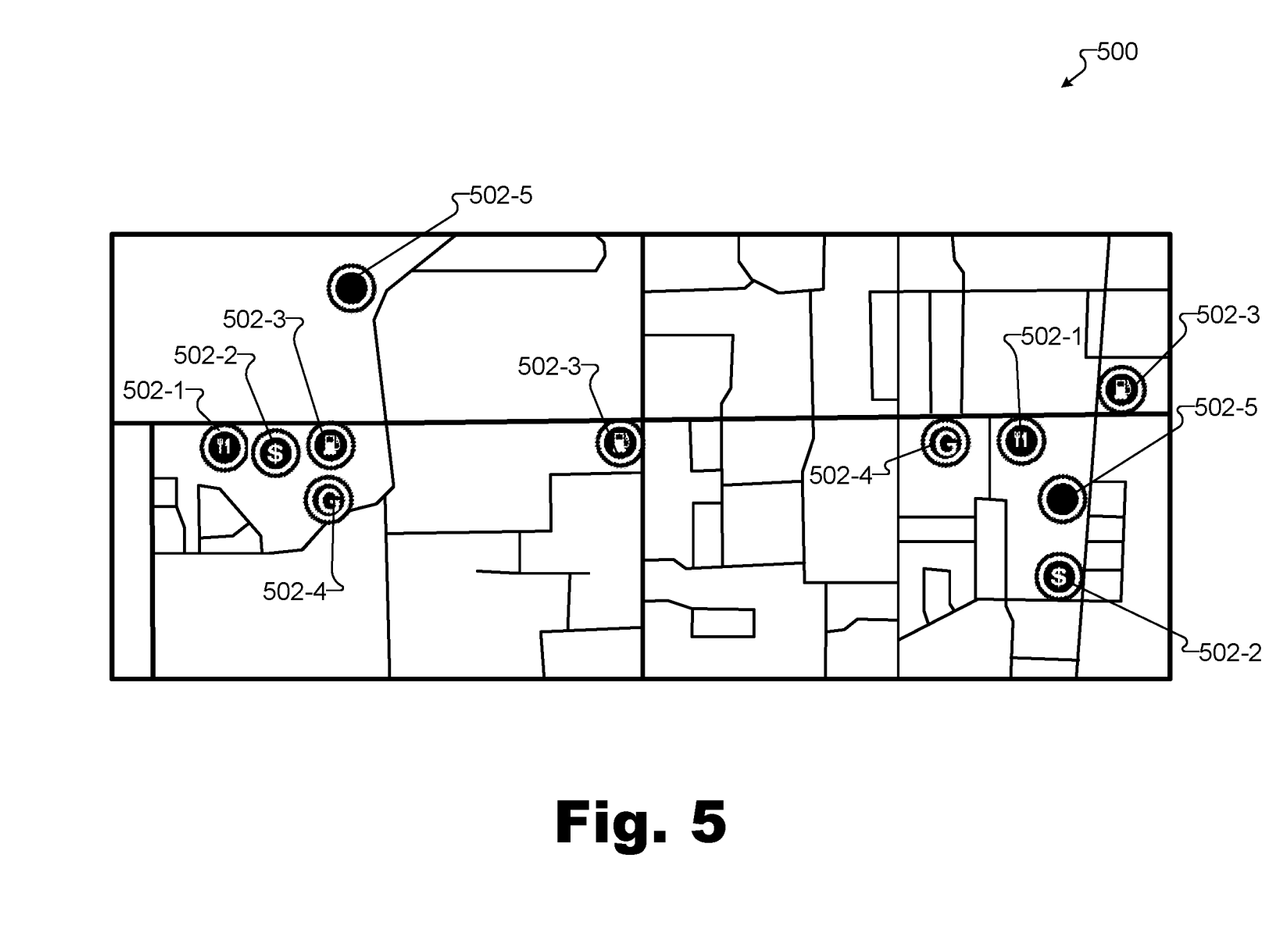
FIG. 5 shows an exemplary user interface map illustrating icons for points-of-interest according to principles described herein.

FIG. 5 shows an exemplary user interface map 500 that may be provided by mapping service system 308 for display. As shown, user interface map 500 may include multiple icons 502. Icons 502 may be selected, by mapping service system 308, for display in user interface map 500, based on datasets in points-of-interest data store 306. For instance, mapping service system 308 may select icons 502 for display based on the selected primary points-of-interest types assigned to points-of-interest represented in points-of-interest data store 306. In FIG. 5, for example, each of icons 502-1 may represent a point-of-interest assigned a restaurant type as its primary point-of-interest type, each of icons 502-2 may represent a point-of-interest assigned a bank type as its primary point-of-interest type, each of icons 502-3 may represent a point-of-interest assigned a gas station type as its primary point-of-interest type, each of icons 502-4 may represent a point-of-interest assigned a grocery store type as its primary point-of-interest type, and each of icons 502-5 may represent a point-of-interest assigned a generic type as its primary point-of-interest type.

In certain examples, icons 502 may include any suitable graphical representation of the associated primary point-of-interest type. For example, as shown in FIG. 5, icon 502-1 may include a fork and knife to illustrate a restaurant type, which is the point-of-interest type associated with icon 502-1. Icon 502-2 may include a dollar sign to illustrate a bank type, which is the point-of-interest type associated with icon 502-2. Icon 502-3 may include a gas pump to illustrate a gas station type, which is the point-of-interest type associated with icon 502-3. Icon 502-4 may include a 'G' to illustrate a grocery store type, which is the point-of-interest type associated with icon 502-4. Icon 502-5 may include a black circle to illustrate a generic point-of-interest type, which is the point-of-interest type associated with icon 502-5.

In certain examples, icons 502 representing point-of-interest types within similar categories (e.g., bars and restaurants, or doctor office and medical facility) may have any number of common characteristics, such as one or more shared visual characteristics. For example, icons 502 that represent similar categories may have the same color background, such that user 310 may recognize, from icons 502, points-of-interest that have common categories of items and/or services.

Returning to FIG. 3, mapping service system 308 may provide user interface map 500 with icons 502 to device 312 via network 314. Device 312 may receive user interface map 500 from mapping service system 308 and provide user interface map 500 to user 310 in any suitable way. For example, device 312 may display user interface map 500 on a user interface (e.g., a display screen).

In certain examples, mapping service system 308 may change icons 502 on user interface map 500 in any suitable manner as user 310 browses the user interface map 500 (e.g., as user 310 changes the view to include a different area of user interface map 500, such as by panning or zooming in on or out from user interface map 500). For example, mapping service system 308 may determine points-of-interest located within a new area of user interface map 500, access datasets for points-of-interest within the new area (from points-of-interest data store 306), select or generate the corresponding icons 502 based on primary point-of-interest types assigned in the datasets, and provide user interface map 500 with the corresponding icons 502 to device 312.

In certain examples, mapping service system 308 may utilize the primary point-of-interest type assigned to a point-of-interest in any other suitable manner. For example, mapping service system 308 may utilize a primary point-of-interest type to generate or adjust search results to be provided to device 312. To illustrate, mapping service system 308 may receive a search query from device 312, perform a search, and include different points-of-interest in search results for the search query. Prior to returning the search results, mapping service system 308 may access datasets for points-of-interest stored in points-of-interest data store 306 to determine which, if any, points-of-interest in the search results include an assigned primary point-of-interest type. Mapping service system 308 may, based on an assigned primary point-of-interest type being included within a dataset for a point-of-interest, adjust the search results in any suitable manner. For example, if the search query was for grocery stores and the dataset 304 for exemplary point-of-interest 'Superstore' included grocery store as the primary point-of-interest, mapping service system 308 may move exemplary point-of-interest 'Superstore' up in relevancy rankings of the search results provided to device 312.

The examples of operations performed by point-of-interest identification system 100 and facilities or components within point-of-interest identification system 100 to determine and assign a primary point-of-interest type for a point-of-interest are illustrative and other exemplary operations may be performed and other exemplary configurations may exist without varying from the scope of the disclosure. For example, the trained neural network 400 may be divided into any suitable number of trained neural networks. In one example, for instance, each trained neural network may be trained to generate a score for a respective point-of-interest type. In certain examples, each trained neural network may receive the same vector 406 for a point-of-interest as input 402, process the values included in vector 406 in one or more hidden layers, and provide a single score 408 (representative of point-of-interest type associated with the trained neural network) for the point-of-interest as output 404. In this example, point-of-interest identification system 100 may perform one or more operations on the scores output from the multiple trained neural networks to select a primary point-of-interest type for the point-of-interest as described herein.

Figure 6:
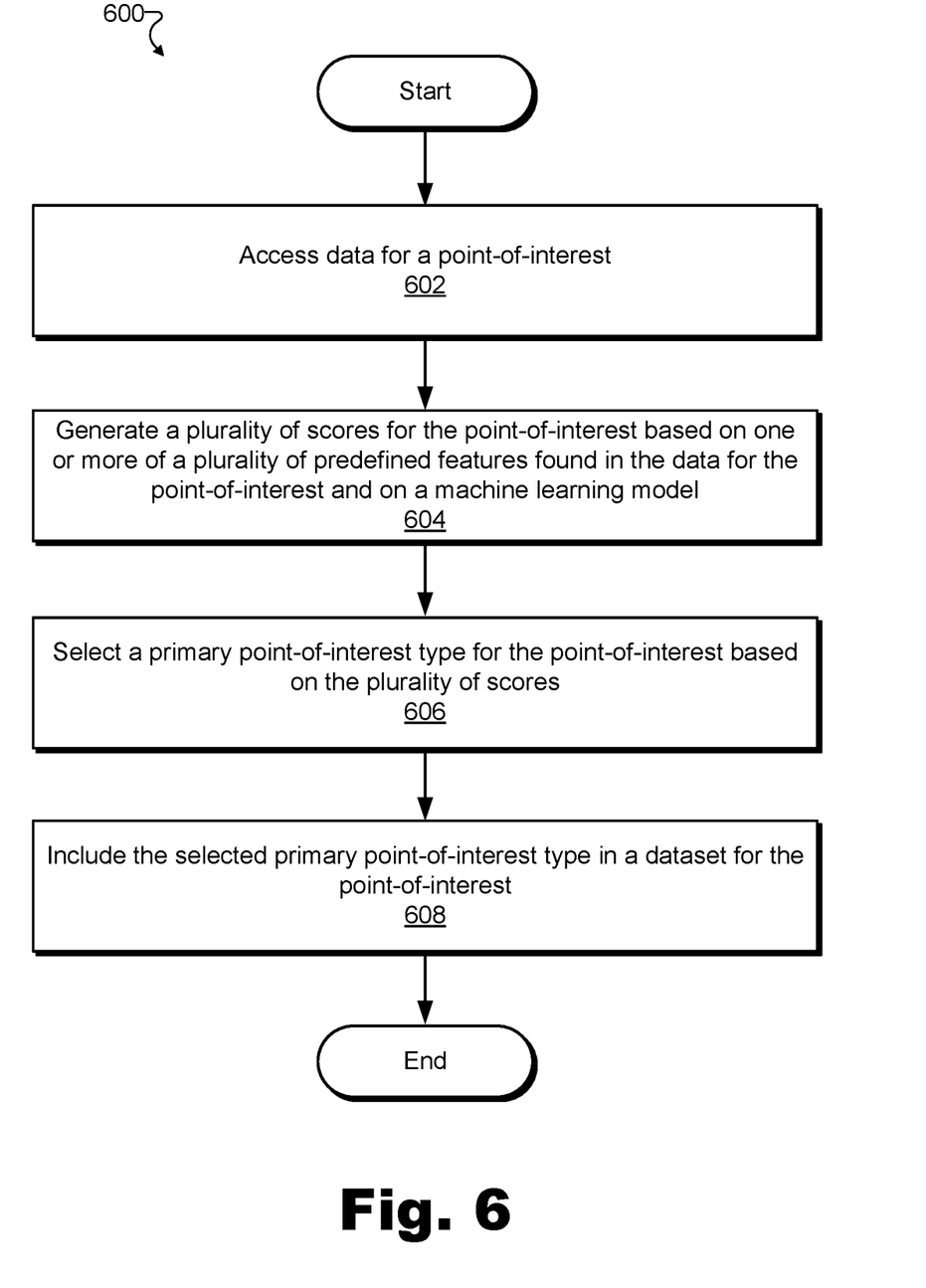
FIG. 6 illustrates an exemplary method for determining and assigning a primary point-of-interest type for a point-of-interest according to principles described herein.

FIG. 6 illustrates an exemplary method 600 for determining and assigning a primary point-of-interest type for a point-of-interest. While FIG. 6 illustrates exemplary operations according to one embodiment, other embodiments may omit, add to, reorder, and/or modify any of the operations shown in FIG. 6. One or more of the operations shown in FIG. 6 may be performed by system 100, any components included therein, and/or any implementation thereof.

In operation 602, data for a point-of-interest is accessed. Operation 602 may be performed in any of the ways described herein.

In operation 604, a plurality of scores for the point-of-interest are generated. Operation 604 may be performed in any of the ways described herein. In one example, a point-of-interest identification system may generate the plurality of scores for a point-of-interest based on one or more of a plurality of predefined features found in the dataset for the point-of-interest. For example, the point-of-interest identification system may generate the plurality of scores based on a weighted combination of values (e.g., values based on the predefined features) within a vector for the point-of-interest.

In operation 606, a primary point-of-interest type for the point-of-interest is selected. Operation 606 may be performed in any of the ways described herein. In one example, the point-of-interest identification system may select the primary point-of-interest type based on the plurality of scores for the point-of-interest. For example, the point-of-interest identification system may select a primary point-of-interest type associated with a highest score of the plurality of scores.

In operation 608, the selected primary point-of-interest type for the point-of-interest is included in a dataset for the point-of-interest. Operation 608 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer may read.

Figure 7:
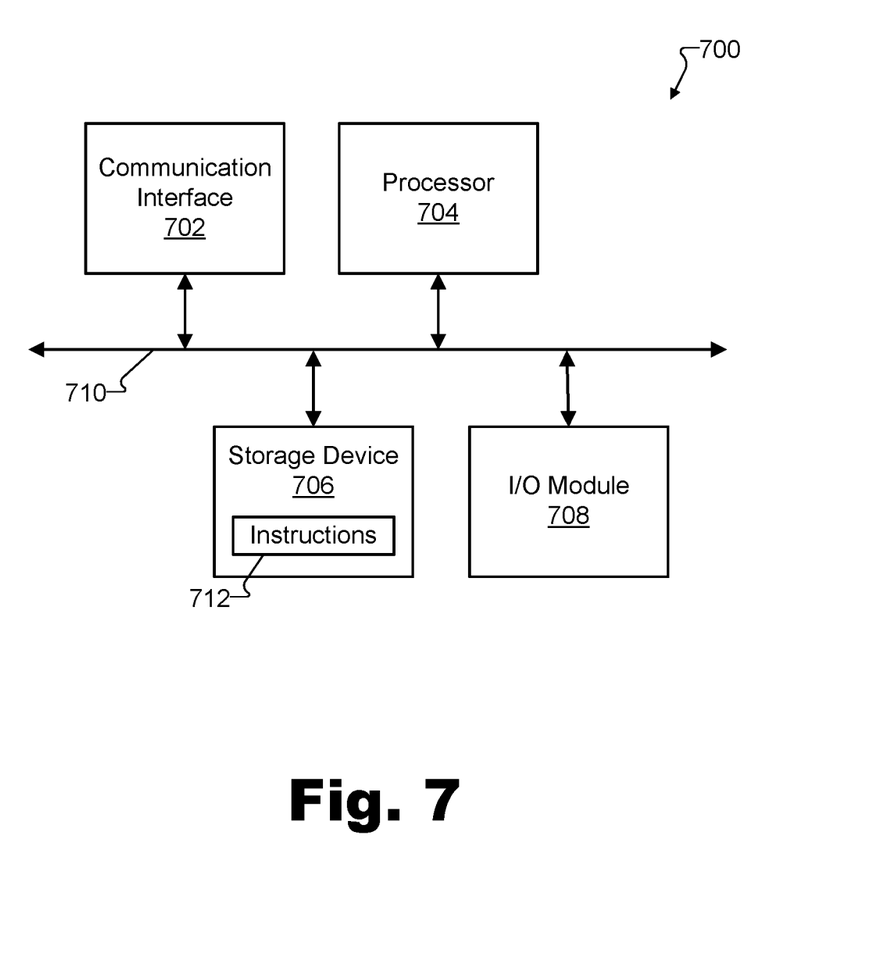
FIG. 7 illustrates an exemplary computing device according to principles described herein.

FIG. 7 illustrates an exemplary computing device 700 that may be specifically configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. One or more I/O modules may be used to receive input for a single virtual experience. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with facilities 102 through 108 of system 100. Likewise, storage facility 110 of system 100 may be implemented by or within storage device 706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a point-of-interest identification system, data for a point-of-interest;
   generating, by the point-of-interest identification system, a plurality of scores for the point-of-interest based on one or more of a plurality of predefined features found in the data for the point-of-interest and on a machine learning model, the plurality of scores represented in a data structure in which each score included in the plurality of scores is located at a different position and each position within the data structure is associated with a different point-of-interest type;
   selecting, by the point-of-interest identification system based on the plurality of scores, a primary point-of-interest type for the point-of-interest, the selecting of the primary point-of-interest type for the point-of-interest comprising:
   determining, by the point-of-interest identification system, that none of the plurality of scores satisfy a threshold score level; and
   selecting, by the point-of-interest identification system based on none of the plurality of scores satisfying the threshold score level, a generic point-of-interest type as the primary point-of-interest type for the point-of-interest;
   including, by the point-of-interest identification system, the selected primary point-of- interest type in a dataset for the point-of-interest;
   selecting, by a computer-implemented mapping service system based on the selected primary point-of-interest type, an icon for the point-of-interest; and
   providing, by the computer-implemented mapping service system, the selected icon for the point-of-interest for display on a user interface map.

2. The method of claim 1, wherein:
   the data structure is a vector; and
   the generating of the plurality of scores for the point-of-interest comprises submitting an input vector for the point-of-interest as input to a trained neural network that outputs the plurality of scores for the point-of-interest represented in the vector, wherein the input vector includes a plurality of values, each value determined based on whether a respective one of the plurality of predefined features is found in the data for the point-of-interest.

3. The method of claim 1, wherein each of the plurality of point-of-interest types is associated with a different icon.

4. The method of claim 1, further comprising:
   during a training phase of the point-of-interest identification system
   receiving, by the point-of-interest identification system, a test vector for a test point-of-interest, the test vector including a plurality of values, each value determined based on whether a respective one of the plurality of predefined features is found in test data for the test point-of-interest;
   receiving, by the point-of-interest identification system, an identification of a point-of-interest type for the test point-of-interest; and
   training, by the point-of-interest identification system, a computer scoring model based on the test vector for the test point-of-interest and the identification of the point-on-interest type for the test point-of-interest.

5. The method of claim 1, further comprising:
   accessing, by the point-of-interest identification system, additional data for an additional point-of-interest;
   generating, by the point-of-interest identification system, an additional plurality of scores for the additional point-of-interest based on one or more of an additional plurality of predefined features found in the additional data for the additional point-of-interest and on the machine learning model, the additional plurality of scores represented in an additional data structure;
   selecting, by the point-of-interest identification system based on the additional plurality of scores, an additional primary point-of-interest type for the additional point-of-interest; and
   including, by the point-of-interest identification system, the selected additional primary point-of-interest type in an additional dataset for the additional point-of-interest.

6. The method of claim 5, wherein:
   the additional data structure is a vector; and
   the selecting of the additional primary point-of-interest type for the additional point-of-interest comprises:

determining, by the point-of-interest identification system, a position within the vector for a highest-ranked score of the additional plurality of scores; and selecting, by the point-of-interest identification system based on the position within the vector for the highest-ranked score, a point-of-interest type as the additional primary point-of-interest type, wherein the point-of-interest type is associated with the position within the vector for the highest-ranked score.

7. The method of claim 5, wherein:

the additional data structure is a vector; and the selecting of the additional primary point-of-interest type for the additional point-of-interest comprises:

determining, by the point-of-interest identification system, that a highest-ranked score of the additional plurality of scores is located at a flagged position within the vector of the additional plurality of scores; and selecting, by the point-of-interest identification system based on the highest-ranked score of the additional plurality of scores being located at the flagged position within the vector, the generic point-of-interest type as the additional primary point-of-interest type for the additional point-of-interest.

8. A system comprising:

at least one physical computing device configured to:

access data for a point-of-interest;

generate a plurality of scores for the point-of-interest based on one or more of a plurality of predefined features found in the data for the point-of-interest and on a machine learning model, the plurality of scores represented in a data structure in which each score included in the plurality of scores is located at a different position and each position within the data structure is associated with a different point-of-interest type;

select, based on the plurality of scores, a primary point-of-interest type for the point-of-interest, the selecting of the primary point-of-interest type for the point-of-interest comprising:

determining that none of the plurality of scores satisfy a threshold score level; and selecting, based on none of the plurality of scores satisfying the threshold score level, a generic point-of-interest type as the primary point-of-interest type for the point-of- interest;

include the selected primary point-of-interest type in a dataset for the point-of-interest;

select, based on the selected primary point-of-interest type, an icon for the point-of-interest; and provide the selected icon for the point-of-interest for display on a user interface map.

9. The system of claim 8, wherein:

the data structure is a vector; and the generation of the plurality of scores for the point-of-interest comprises submitting an input vector for the point-of-interest as input to a trained neural network that outputs the plurality of scores for the point-of-interest represented in the vector, wherein the input vector includes a plurality of values, each value determined based on whether a respective one of the plurality of predefined features is found in the data for the point-of-interest.

10. The system of claim 8, wherein each of the plurality of point-of-interest types is associated with a different icon.

11. The system of claim 8, wherein, during a training phase of the system, the at least one physical computing device is further configured to:

receive a test vector for a test point-of-interest, the test vector including a plurality of values, each value determined based on whether a respective one of the plurality of predefined features is found in test data for the test point-of-interest;

receive an identification of a point-of-interest type for the test point-of-interest; and train a computer scoring model based on the test vector for the test point-of-interest and the identification of the point-on-interest type for the test point-of-interest.

12. The system of claim 8, wherein the at least one physical computing device is further configured to:

access additional data for an additional point-of-interest;

generate an additional plurality of scores for the additional point-of-interest based on one or more of an additional plurality of predefined features found in the additional data for the additional point-of-interest and on the machine learning model, the additional plurality of scores represented in an additional data structure;

select, based on the additional plurality of scores, an additional primary point-of-interest type for the additional point-of-interest; and include the selected additional primary point-of-interest type in an additional dataset for the additional point-of-interest.

13. The system of claim 12, wherein:

the additional data structure is a vector; and the selection of the additional primary point-of-interest type for the additional point-of-interest comprises:

determining a position within the vector for a highest-ranked score of the additional plurality of scores; and selecting, based on the position within the vector for the highest-ranked score, a point-of-interest type as the additional primary point-of-interest type, wherein the point-of-interest type is associated with the position within the vector for the highest-ranked score.

14. The system of claim 12, wherein:

the additional data structure is a vector; and the selection of the additional primary point-of-interest type for the additional point-of-interest comprises:

determining that a highest-ranked score of the additional plurality of scores is located at a flagged position within the vector of the additional plurality of scores; and selecting, based on the highest-ranked score of the additional plurality of scores being located at the flagged position within the vector, the generic point-of-interest type as the additional primary point-of-interest type for the additional point-of-interest.

15. A non-transitory computer-readable medium storing instructions that, when executed, direct at least one processor of a computing device to:

access data for a point-of-interest;

generate a plurality of scores for the point-of-interest based on one or more of a plurality of predefined features found in the data for the point-of-interest and on a machine learning model, the plurality of scores represented in a data structure in which each score included in the plurality of scores is located at a different position and each position within the data structure is associated with a different point-of-interest type;

select, based on the plurality of scores, a primary point-of-interest type for the point-of-interest, the selecting of the primary point-of-interest type for the point-of-interest comprising:
  determining that none of the plurality of scores satisfy a threshold score level; and
  selecting, based on none of the plurality of scores satisfying the threshold score level, a generic point-of-interest type as the primary point-of-interest type for the point-of-interest;
include the selected primary point-of-interest type in a dataset for the point-of-interest;
select, based on the selected primary point-of-interest type, an icon for the point-of-interest; and
provide the selected icon for the point-of-interest for display on a user interface map.

16. The computer-readable medium of claim 15, wherein:
the data structure is a vector; and
the generation of the plurality of scores for the point-of-interest comprises
  submitting an input vector for the point-of-interest as input to a trained neural network that outputs the plurality of scores for the point-of-interest represented in the vector, wherein the input vector includes a plurality of values, each value determined based on whether a respective one of the plurality of predefined features is found in the data for the point-of-interest.

17. The computer-readable medium of claim 15, wherein, during a training phase of a system, the instructions, when executed, direct the at least one processor of the computing device to:
  receive a test vector for a test point-of-interest, the test vector including a plurality of values, each value determined based on whether a respective one of the plurality of predefined features is found in test data for the test point-of-interest;
  receive an identification of a point-of-interest type for the test point-of-interest; and
  train a computer scoring model based on the test vector for the test point-of-interest and the identification of the point-on-interest type for the test point-of-interest.

18. The computer-readable medium of claim 15, wherein the instructions, when executed, further direct the at least one processor of the computing device to:
  access additional data for an additional point-of-interest;
  generate an additional plurality of scores for the additional point-of-interest based on one or more of an additional plurality of predefined features found in the additional data for the additional point-of-interest and on the machine learning model, the additional plurality of scores represented in an additional data structure;
  select, based on the additional plurality of scores, an additional primary point-of-interest type for the additional point-of-interest; and
  include the selected additional primary point-of-interest type in an additional dataset for the additional point-of-interest.

19. The computer-readable medium of claim 18, wherein:
the additional data structure is a vector; and
the selection of the additional primary point-of-interest type for the additional point-of-interest comprises:
  determining a position within the vector for a highest-ranked score of the additional plurality of scores; and
  selecting, based on the position within the vector for the highest-ranked score, a point-of-interest type as the additional primary point-of-interest type, wherein the point-of-interest type is associated with the position within the vector for the highest-ranked score.

20. The computer-readable medium of claim 18, wherein:
the additional data structure is a vector; and
the selection of the additional primary point-of-interest type for the additional point-of-interest comprises:
  determining that a highest-ranked score of the additional plurality of scores is located at a flagged position within the vector of the additional plurality of scores; and
  selecting, based on the highest-ranked score of the additional plurality of scores being located at the flagged position within the vector, the generic point-of-interest type as the additional primary point-of-interest type for the additional point-of-interest.

* * * * *